United States Patent [19]

Suzuki et al.

[11] Patent Number: 4,546,617

[45] Date of Patent: Oct. 15, 1985

[54] ENERGY-SAVING AIR CONDITIONING SYSTEM FOR VEHICLES

[75] Inventors: Nobuhiko Suzuki; Masaya Sasaki, both of Konan, Japan

[73] Assignee: Diesel Kiki Co., Ltd., Tokyo, Japan

[21] Appl. No.: 626,431

[22] Filed: Jun. 29, 1984

[30] Foreign Application Priority Data

Jul. 5, 1983 [JP] Japan .............................. 58-122239

[51] Int. Cl.⁴ .............................................. B60H 3/00
[52] U.S. Cl. ......................................... 62/180; 165/43
[58] Field of Search ................... 165/43; 62/180, 186, 62/228.3, 228.5; 236/49

[56] References Cited

U.S. PATENT DOCUMENTS 3,684,170  8/1972  Roof ................................. 236/49 X
3,861,829  1/1975  Roberts et al. ......................... 417/53
4,112,703  9/1978  Kountz ................................. 62/211
4,320,797  3/1982  Kagohata ........................... 165/43 X Primary Examiner—William E. Wayner
Attorney, Agent, or Firm—Frishauf, Holtz, Goodman & Woodward

[57] ABSTRACT

An air conditioning system for a vehicle has a compressor adapted to vary its capacity so as to maintain the suction pressure of refrigerant. A door is arranged upstream of the evaporator in an air passage, which can assume a variable opening to vary the refrigerating capacity of the evaporator. The opening of the door is controlled in response to the set position of temperature setting means which sets the discharge air temperature, whereby the refrigerating capacity of the evaporator can be reduced when overcooling takes place, to thereby reduce the work done by the compressor for minimizing a waste of energy.

6 Claims, 3 Drawing Figures

ENERGY-SAVING AIR CONDITIONING SYSTEM FOR VEHICLES

BACKGROUND OF THE INVENTION

This invention relates to an air conditioning system for use in a vehicle, which is adapted to reduce the waste of energy of the compressor.

In an air conditioning system adapted for use in an automotive vehicle, a compressor is connected to an engine installed in the vehicle, through an electromagnetic clutch, to be driven by the engine to compress refrigerant and feed the compressed refrigerant to a condenser for liquefying same. Liquefied refrigerant from the condenser is reduced in pressure by an expansion valve and delivered to an evaporator arranged in an air passage whereby it vaporizes to cool air flowing in the evaporator. A blower is arranged in the air passage upstream of the evaporator and feeds circulated air from the passenger compartment of the vehicle or fresh air to the evaporator, and cooled air from the evaporator is discharged into the passenger compartment to cool the interior thereof. On the other hand, the vaporized refrigerant from the evaporator is again delivered to the compressor for recirculation throughout the above-mentioned component parts. The above cycle of refrigeration is repeated to thereby cool the passenger compartment.

In the air conditioning system arranged as above, the temperature of cooling fins of the evaporator is detected and compared with a set value, and depending upon the result of comparison is the compressor actuated or stopped through engagement or disengagement of the electromagnetic clutch, to thereby control the temperature of air being discharged into the passenger compartment to a desired value.

According to such conventional arrangement wherein the compressor is connected to or disconnected from the engine by operating the electromagnetic clutch, each time the clutch is engaged or disengaged, a shock is produced by the clutch and applied to the vehicle body, creating an unpleasant feeling to the driver and the passenger, and spoiling the driveability of the vehicle.

Such disadvantage might be overcome by employing, in place of the conventional compressor using the electromagnetic clutch, a compressor which is adapted to automatically maintain a constant suction pressure (hereinafter called "the suction pressure-automatic control type"), as proposed in U.S. Pat. No. 3,861,829 issued Jan. 21, 1975. The use of the suction pressure-automatic control type compressor will avoid the occurrence of a shock upon engagement or disengagement of the electromagnetic clutch of the aforementioned conventional compressor, improving the driveability of the vehicle, etc. Besides, the use of the suction pressure-automatic control type compressor will somewhat contribute to curtailment of the energy, since the compressor is operated with an appropriate capacity required to maintain the suction pressure at a predetermined fixed value.

However, there are difficulties in actually replacing the electromagnetic clutch type compressor with the suction pressure-automatic control type compressor. That is, in the latter compressor, the predetermined fixed value to which the suction pressure is to be controlled is set at a value equal to or in the vicinity of a limit value below which freeze-up of the evaporator can take place, so as to achieve sufficient cooling. Further, the predetermined fixed value of suction pressure cannot be optionally adjusted once it has been set. Therefore, the discharge air temperature can drop below a desired value set by the driver or the passenger, resulting in excessive cooling. In such an event, it will be necessary to provide a heater core for heating air once cooled by the evaporator (reheat) to increase the discharge air temperature to a desired temperature. This impedes attainment of expected energy saving with the suction pressure-automatic control type compressor, to an extent excelling the electromagnetic clutch type compressor.

In order to adapt a compressor of the suction pressure-automatic control type to the conventional air conditioning arrangement while at the same time preventing excessive cooling, there has been proposed a refrigeration control system by U.S. Pat. No. 4,112,703 issued Sept. 12, 1978, which employs a compressor of the suction pressure-automatic control type and is adapted to control the refrigerating capacity of the evaporator so as to avoid excessive cooling, thereby dispensing with a heater core for reheating the cooled air from the evaporator. More specifically, in order to control the refrigerating capacity of the evaporator, the proposed control system is provided with an electrically operated solenoid valve as the expansion valve and detects the superheat degree of refrigerant gas at the outlet of the evaporator. In response to the detected superheat degree, the duty cycle of the coil of the solenoid valve is controlled to adjust the valve opening thereof to thereby control the flow rate of refrigerant to be supplied to the evaporator for adjustment of the superheat degree of refrigerant gas at the outlet of the evaporator. Thus, eventually the refrigerating capacity of the evaporator is controlled to maintain the compartment temperature at a desired set value.

However, according to the proposed control system, the control section is complicated in construction, resulting in increased manufacturing costs. The on-off type solenoid valve can undergo hunting, leading to unstable control operation. Further, since the flow rate of refrigerant supplied to the evaporator is varied, the superheat degree is apt to increase, and accordingly the temperature of discharge refrigerant of the compressor can rise, which can cause seizure of component parts of the compressor, etc.

SUMMARY OF THE INVENTION

It is an object of the invention to provide an air conditioning system for vehicles, which employs a compressor of the suction pressure-automatic control type to thereby avoid a shock upon actuation or stoppage of the compressor and improve the driveability of the vehicle, and is also capable of reducing the waste of energy of the compressor.

It is a further object of the invention to provide an air conditioning system for vehicles, which employs control means simple in construction for controlling the refrigerating the capacity of the evaporator.

The present invention provides an air conditioning system for a vehicle, which comprises: an air passage for guiding air to be discharged into the passenger compartment of the vehicle; an evaporator arranged in the air passage for refrigerating air guided therein; temperature setting means for setting the temperature of air discharged into the passenger compartment, which assumes a set position corresponding to a set value of the temperature of the discharged air; a compressor for compressing suction refrigerant supplied from the evaporator, which is of the type adapted to control the flow rate of refrigerant discharged therefrom so as to maintain the suction pressure i.e. the pressure of the suction refrigerant at a predetermined fixed value; a door arranged in the air passage at a location upstream of the evaporator, said door being disposed to assume a variable opening determining the refrigerating capacity of the evaporator; and driving means responsive to the set position of the temperature setting means for driving the door to vary the opening thereof.

The above and other objects, features and advantages of the invention will be more apparent from the ensuing detailed description taken in conjunction with the accompanying drawings.

DETAILED DESCRIPTION

The invention will now be described in detail with reference to the drawings.

Figure 1:
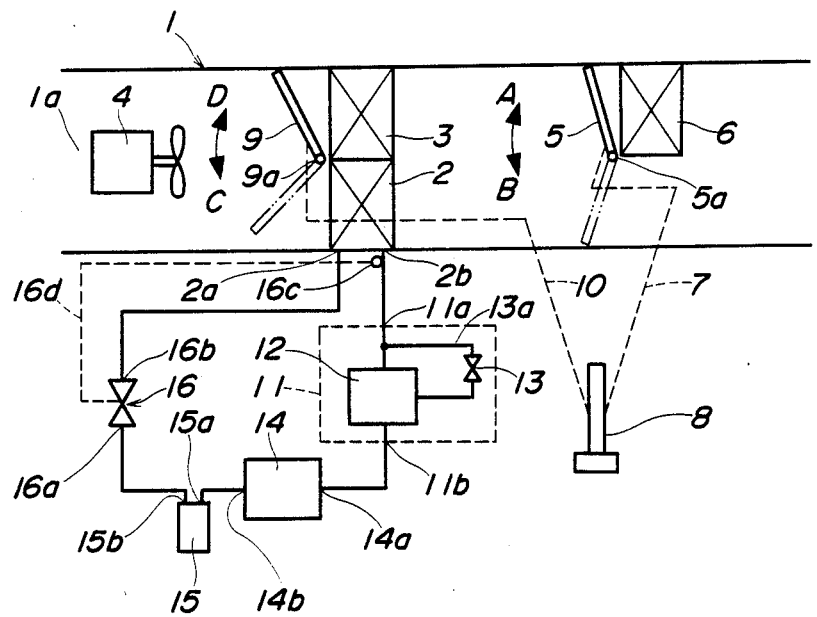
FIG. 1 is a block diagram of an embodiment of the air conditioning system for a vehicle according to the invention.

Referring first to FIG. 1, there is schematically illustrated an air conditioning system according to the invention. In the figure, reference numeral 1 designates an air passage in which are arranged an evaporator 2 and a dummy resistance element 3 juxtaposed along a line normal to the direction in which air is guided in the air passage 1 and in a manner occupying the whole cross sectional area of the air passage 1. The dummy resistance element 3 is formed of a synthetic material or the like having substantially the same flow resistance value as the evaporator 2. Also provided in the air passage 1 are a blower motor 4 disposed at an upstream end or inlet of the air passage 1, and an air mix door 5 and a heater core 6 dispsoed at a location downstream of the evaporator 2 and the dummy resistance element 3. Th air mix door 5 is operatively connected to a temperature setting means 8 by means of a wire cable 7 so that it is pivoted about its fulcrum 5a in the direction indicated by the arrow A or in the direction indicated by the arrow B to an angular position corresponding to a set position of an adjusting lever 8a (FIG. 2) of the temperature setting means 8, to thereby adjust the flow rate of air through the heater core 6, as hereinafter described in detail.

Also provided in the air passage 1 is a control door 9 disposed immediately upstream of the evaporator 2 and the dummy resistance element 3 to adjust the flow rate of air through the evaporator 2. Also the control door 9 is operatively connected to the above-mentioned temperature setting means 8 so that it is pivoted about its fulcrum 9a disposed at the junction between the evaporator 2 and the dummy resistance element 3 in the direction indicated by the arrow C or in the direction indicated by the arrow D to a position corresponding to a set position of the adjusting lever 8a of the temperature setting means 8, to thereby adjust the flow rate of air through the evaporator 2.

Figure 2:
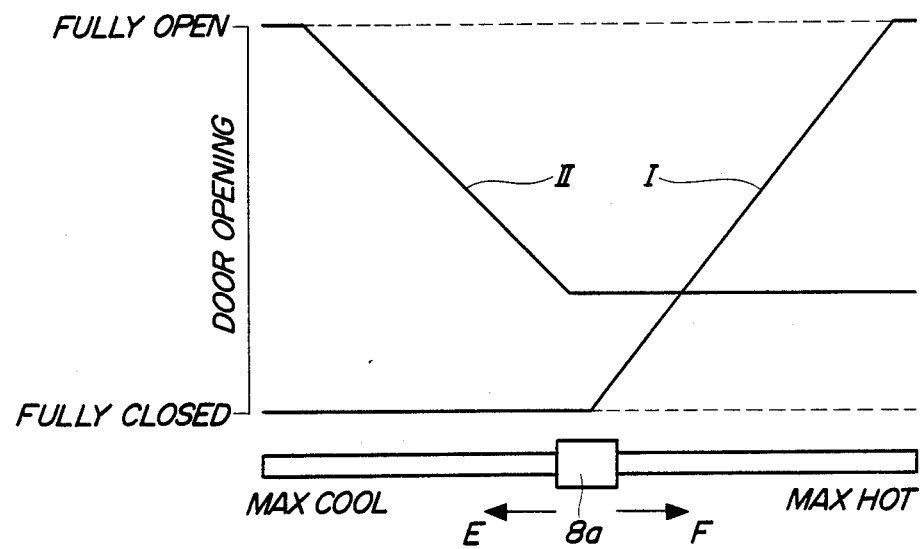
FIG. 2 is a graph showing the relationship between the set position of a temperature setting means in FIG. 1 and the opening of a control door in FIG. 1.

More specifically, the air mix door 5 and the temperature setting means 8 are so disposed that the degree of opening of the air mix door 5 determining the flow rate of air through the heater core 6 is varied in response to a change in the set position of the adjusting lever 8a of the temperature setting means 8, as indicated by the solid line I in FIG. 2. That is, when the temperature setting means 8 assumes a maximum heating position MAX HOT, the door 5 is in a fully open position as indicated by the two dot-chain line in FIG. 1. As the temperature setting means 8 is operated to move toward the cooling side as indicated by the arrow E in FIG. 2, the door 5 has its opening gradually reduced. While the position of the temperature setting means 8 moves from a substantially middle position between the maximum heating position and a maximum cooling position MAX COOL to the maximum cooling position, the door 5 is kept in a fully closed position as indicated by the solid line in FIG. 1.

On the other hand, the control door 9 and the temperature setting means 8 are so disposed that the degree of opening of the control door 9 determining the flow rate of air through the evaporator 2 is varied in response to a change in the set position of the adjusting lever 8a of the temperature setting means 8, as indicated by the solid line II in FIG. 2. That is, when the temperature setting means 8 assumes the maximum cooling position MAX COOL indicated by the solid line in FIG. 1, the door 9 is in a fully open position as indicated by th solid line in FIG. 1. As the temperature setting means 8 is moved toward the heating side as indicated by the arrow F in FIG. 2, the door 9 has its opening gradually reduced. When the temperature setting means 8 assumes a substantially middle position between the maximum heating position MAX HOT and the maximum cooling position MAX COOL, the door 9 assumes a constant position providing a predetermined opening as indicated by the two dot-chain line in FIG. 1, and is kept at this position while the temperature setting means 8 moves from the substantially middle position to the maximum heating position MAX HOT. With this dispositions of the doors, during operation in a heating mode wherein the temperature setting means 8 assumes a position between the substantially middle position and the maximum heating position MAX HOT, dehumidification of the cooled air is always carried by the evaporator 2.

The outlet of the evaporator 2 is connected to the inlet 11a of a compressor of the suction pressure-automatic control type (hereinafter merely called "the compressor") 11, which comprises a main body 12, and a stroke control valve 13 arranged across a vent 13a extending from a crankcase within the main body 12 to a suction port 11a of the compressor for adjusting the restriction in the vent 13a. The stroke control valve 13 operates to vary the capacity of the compressor 11 so as to maintain the suction pressure at a predetermined fixed value. To be specific, when the suction pressure drops below the predetermined fixed value, the stroke control valve 13 acts to increase the restriction in the vent 13a and hence increase the crankcase pressure. With the increase of the crankcase pressure, the stroke of pistons of the compressor decreases to thereby reduce the displacement or capacity of the compressor. On the contrary, when the suction pressure rises above the predetermined fixed value, the valve 3 acts to decrease the restriction in the vent 13a to reduce the crankcase pressure and hence increase the capacity of the compressor.

The discharge port 11b of the compressor 11 is connected to the inlet 14a of a condenser 14 which in turn has its outlet 14b connected to the inlet 16a of a thermostatic expansion valve 16. The outlet 16b of the expansion valve 16 is connected to the inlet 2a of the evaporator 2. The thermostatic expansion valve 16 has a sensing portion 16c disposed in contact with the outer peripheral surface of a pipe forming the outlet 2b of the evaporator 2, and connected to the main body of the valve 16 by a pipe 16d. Thus, the expansion valve 16 senses the superheat degree of refrigerant gas at the outlet 2b of the evaporator 2 and is closed or opened in response to the sensed superheat degree to regulate the flow rate of refrigerant to be supplied to the evaporator 2 so as to maintain the superheat degree constant.

The operation of the air conditioning system according to the invention constructed as above will now be described. If the temperature setting means 8 is set to the maximum cooling position MAX COOL in FIG. 2, the air mix door 5 is accordingly moved to its fully closed position (indicated by the solid line in FIG. 1), and the control door 9 to its fully open position (indicated by the solid line in FIG. 1), respectively, while at the same time the dummy resistance element 3 has its inlet fully closed by the door 9, whereby all the amount of air introduced into the air passage 1 by the blower motor 4 is forced to pass through the evaporator 2. When the temperature of air introduced into the air passage 1 is high, the boiling amount of refrigerant in the evaporator 2 increases so that the evaporator boiling pressure increases, and accordingly the suction pressure of the compressor 11 increases.

The stroke control valve 13 of the compressor 11 acts to increase the capacity of the compressor as the suction pressure increases, so that compressor 11 operates with increased displacement. Consequently, the refrigerating capacity of the evaporator 2 increases so that the air is efficiently cooled by the evaporator 2 as it travels through the latter, to lower the temperature of air discharged into the passenger compartment. The cooled air discharged into the passenger compartment cools the interior of same and then is again introduced into the air passage 1 by the blower motor 4.

As the temperature of air introduced into the air passage 1 thus gradually lowers with circulation of air between the passenger compartment and the air conditioning system, the boiling amount of refrigerant in the evaporator 2 decreases to lower the evaporator boiling pressure and thus the suction pressure of the compressor 11. Responsive to this reduced suction pressure, the stroke control valve 13 acts to reduce the capacity of the compressor 11 so that the suction pressure is controlled to the predetermined fixed value. Thereafter, the compressor 11 is thus operated so as to provide the evaporator 2 with a flow rate of compressed refrigerant required to maintain the suction pressure at the predetermined fixed value.

The air conditioning system according to the invention has its refrigerating capacity set at such an adequate value as to fully cool air introduced into the air passage 1 even with a maximum heat load applied thereon, like an ordinary air conditioning system. Therefore, if the compressor 11 is still operated even after its suction pressure has reached the predetermined fixed value, it can result in excessive cooling of the air such that the temperature in the passenger compartment drops below a desired temperature. In such an event, the driver or the passenger will move the control lever 8a of the temperature setting means 8 in the direction indicated by the arrow F in FIG. 2 to thus displace the control door 9 from its fully open position by suitable degrees of angle. Thus, the inlet of the dummy resistance element 3 is partly opened to allow part of the air introduced into the air passage 1 to flow therethrough. At the same time, the substantial area of the inlet opening of the evaporator 2 is reduced so that a restricted amount of air is supplied into the evaporator 2. This causes a decrease in the boiling amount of refrigerant in the evaporator 2. As a consequence, the refrigerant pressure at the outlet of the evaporator 2, i.e. the suction pressure of the compressor 11 drops below the predetermined fixed value. Responsive to this suction pressure drop, the stroke control valve 13 operates to reduce the capacity of the compressor 11, until it reaches a value sufficient to maintain the suction pressure at the predetermined fixed value. After this, the compressor is operated with the thus reduced capacity. In this way, the work done by the compressor is reduced to a smaller amount than when the control door 9 fully opens the inlet of the evaporator 2, to thereby save a waste of energy by the reduced amount of the work done by the compressor.

Figure 3:
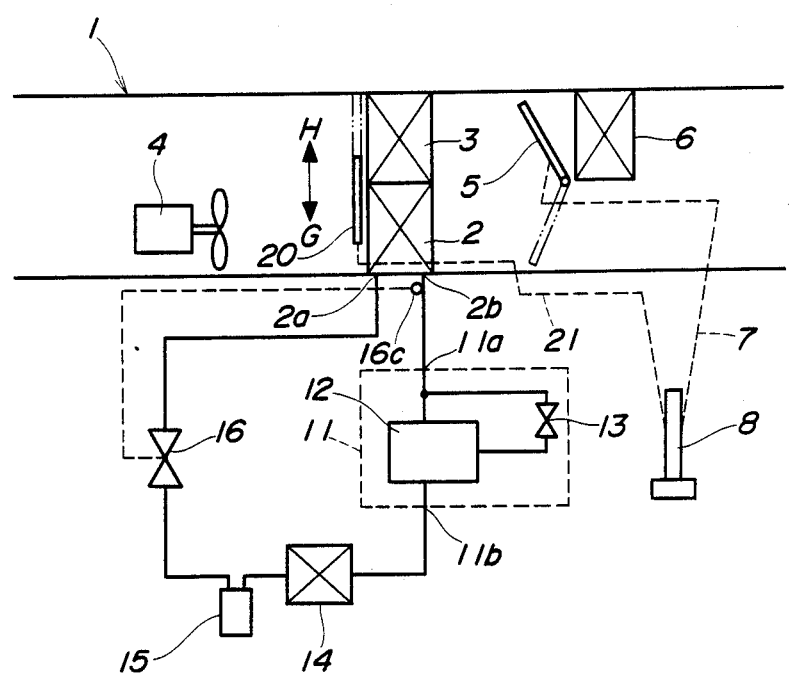
FIG. 3 is a block diagram of another embodiment of the air conditioning system according to the invention.

FIG. 3 shows a second embodiment of the invention. In FIG. 3, elements corresponding to those in FIG. 1 are designated by identical reference characters, and description of which is omitted. In the figure, a control door 20, which comprises a slide door, is arranged immediately upstream of the evaporator 2 and the dummy resistance element 3 and has a side surface area set at substantially the same value as the area of the inlet opening of the evaporator 2. The door 20 is disposed for movement parallel with the inlet side walls of the evaporator 2 and the dummy resistance element 3, selectively in the direction indicated by the arrow G and in the direction indicated by the arrow H, and drivingly connected to the temperature setting means 8 by means of a wire cable 21 to make such parallel movement. Thus, the door 20 is moved in the direction of the arrow G or H by the temperature setting means in the below stated manner, to vary the substantial area of the inlet opening of the evaporator 2 and thus the effective area of heat transfer from the air to the refrigerant within the evaporator 2.

As indicated by the solid line II in FIG. 2, when the temperature setting means 8 is set to the maximum cooling position MAX COOL, the door 20 is moved in the direction of the arrow H in FIG. 3 to assume a fully open position, to thereby maximize the effective area of heat transfer of the evaporator 2, while simultaneously fully blocking the inlet of the dummy resistance element 3. As the temperature setting means 8 is moved toward the heating side or in the direction of the arrow F, the slide door 20 is moved in the direction of the arrow G in FIG. 3 so that the effective area of heat transfer of the evaporator 2 is gradually reduced, while simultaneously gradually increasing the substantial area of inlet opening of the dummy resistance element 3. At a substantially middle position of the temperature setting means 8 between the maximum cooling position MAX COOL and the maximum heating position MAX HOT in FIG. 2, the door 20 assumes a predetermined opening and hence is kept at the same opening while the temperature setting means 8 is moved from the substantially middle position to the maximum heating position MAX HOT.

Incidentally, the manner of setting the position of the door 5 is identical with that described with respect to the first embodiment.

When the temperature setting means 8 is set to the maximum cooling position MAX COOL in FIG. 2, the evaporator 2 has the maximum effective area of heat transfer, and at the same time the dummy resistance element 3 has its inlet fully blocked by the door 20, whereby all the amount of air introduced into the air passage 1 is forced to pass through the evaporator 2 which thus exhibits its full refrigerating capacity.

When the temperature in the passenger compartment drops below a desired temperature, the temperature setting means 8 will be moved toward the heating side or in the direction of the arrow F by a suitable amount, the door 20 will be correspondingly displaced in the direction of the arrow G to reduce the area of inlet opening of the evaporator 2 or the effective area of heat transfer thereof, while at the same time the inlet of the dummy resistance element 3 is partly opened to allow part of the air introduced into the air passage 1 to flow therethrough. With the reduction of the effective area of heat transfer, the evaporator 2 has its boiling amount of refrigerant, i.e. evaporator boiling pressure reduced. Accordingly, as in the preceding embodiment, the capacity of the compressor 11 is automatically reduced by the stroke control valve 13, curtailing the work done by the compressor and thus avoiding a waste of energy.

While preferred embodiments of the invention have been described, variations thereto will occur to those skilled in the art within the scope of the present inventive concepts which are delineated by the following claims.

What is claimed is:

1. An air conditioning system for a vehicle having a passenger compartment, comprising:
    an air passage for guiding air to be discharged into said passenger compartment of said vehicle;
    an evaporator arranged in said air passage for refrigerating air guided therein;
    temperature setting means for setting the temperature of air discharged into said passenger compartment, said temperature setting means assuming a set position corresponding to a set value of the temperature of air discharged into said passenger compartment;
    a compressor for compressing suction refrigerant supplied from said evaporator, said compressor controlling the flow rate of refrigerant discharged therefrom so as to maintain the pressure of said suction refrigerant at a predetermined fixed value;
    a resistance element arranged in said air passage, said resistance element being juxtaposed with said evaporator along a line substantially normal to the direction of flow of air in said air passage and having flow resistance substantially equal to that of said evaporator;
    a door arranged in said air passage at a location immediately upstream of said evaporator and said resistance element, said door being disposed to assume a variable opening determining the refrigerating capacity of said evaporator; and
    driving means responsive to the set position of said temperature setting means for driving said door to vary the opening thereof;
    said door being disposed such that as the opening of said door varies, one of said evaporator and said resistance element has a substantial area of inlet opening thereof increased, and at the same time the other has a substantial area of inlet opening thereof decreased.

2. An air conditioning system as claimed in claim 1, wherein said door is pivotally movable to vary the flow rate of air through said evaporator.

3. An air conditioning system as claimed in claim 1, wherein said door is arranged for movement parallel with said evaporator to vary the effective area of heat transfer from air to refrigerant within said evaporator.

4. An air conditioning system as claimed in claim 1, wherein said door is disposed to always assume a predetermined opening when said temperature setting means assumes a position falling between a maximum heating position thereof and a predetermined intermediate position thereof, and to assume an opening gradually increasing as said temperature setting means has a set position thereof varied to a maximum cooling position from said predetermined position thereof.

5. An air conditioning system as claimed in claim 1, further including:
    a heater core arranged in said air passage and downstream of said evaporator for heating air discharged from said evaporator;
    and a second door arranged in said air passage and upstream of said heater core, said second door being disposed to assume a variable opening to vary the flow rate of air through said heater core.

6. An air conditioning system as claimed in claim 5, wherein said second door has an opening which is variable in response to the set position of said temperature setting means.

* * * * *